(12) United States Patent (10) Patent No.: US 7,516,113 B2
Horvitz et al. (45) Date of Patent: *Apr. 7, 2009

(54) COST-BENEFIT APPROACH TO AUTOMATICALLY COMPOSING ANSWERS TO QUESTIONS BY EXTRACTING INFORMATION FROM LARGE UNSTRUCTURED CORPORA

(75) Inventors: Eric J. Horvitz, Kirkland, WA (US);
David R. Azari, Seattle, WA (US);
Susan T. Dumais, Kirkland, WA (US);
Eric D. Brill, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 280 days.

This patent is subject to a terminal disclaimer.

(21) Appl. No.: 11/469,136

(22) Filed: Aug. 31, 2006

(65) Prior Publication Data

US 2006/0294037 A1 Dec. 28, 2006

Related U.S. Application Data

(63) Continuation of application No. 10/635,274, filed on Aug. 6, 2003, now Pat. No. 7,454,393.

(51) Int. Cl.
*G06F 17/00* (2006.01)
*G06N 5/02* (2006.01)
(52) U.S. Cl. .................................................... 706/46
(58) Field of Classification Search ................. None
See application file for complete search history.

(56) References Cited

U.S. PATENT DOCUMENTS 5,493,692 A 2/1996 Theimer et al.

(Continued)

FOREIGN PATENT DOCUMENTS

WO 9800787 1/1998

OTHER PUBLICATIONS

Artificial-intelligence approach for biomedical sample characterization using Raman spectroscopy Zhengmao Ye; Automation Science and Engineering, IEEE Transactions on vol. 2, Issue 1, Jan. 2005 pp. 67-73 Digital Object Identifier 10.1109/TASE.2004.840071.*

(Continued)

*Primary Examiner*—Michael B Holmes
(74) *Attorney, Agent, or Firm*—Amin, Turocy & Calvin, LLP

(57) ABSTRACT

The present invention relates to a system and methodology to facilitate extraction of information from a large unstructured corpora such as from the World Wide Web and/or other unstructured sources. Information in the form of answers to questions can be automatically composed from such sources via probabilistic models and cost-benefit analyses to guide resource-intensive information-extraction procedures employed by a knowledge-based question answering system. The analyses can leverage predictions of the ultimate quality of answers generated by the system provided by Bayesian or other statistical models. Such predictions, when coupled with a utility model can provide the system with the ability to make decisions about the number of queries issued to a search engine (or engines), given the cost of queries and the expected value of query results in refining an ultimate answer. Given a preference model, information extraction actions can be taken with the highest expected utility. In this manner, the accuracy of answers to questions can be balanced with the cost of information extraction and analysis to compose the answers.

20 Claims, 12 Drawing Sheets

U.S. PATENT DOCUMENTS

| | | | |
|---|---|---|---|
| 5,519,608 | A | 5/1996 | Kupiec |
| 5,544,321 | A | 8/1996 | Theimer et al. |
| 5,555,376 | A | 9/1996 | Theimer et al. |
| 5,603,054 | A | 2/1997 | Theimer et al. |
| 5,611,050 | A | 3/1997 | Theimer et al. |
| 5,812,865 | A | 9/1998 | Theimer et al. |
| 6,271,913 | B1 | 8/2001 | Jung et al. |
| 6,362,888 | B1 | 3/2002 | Jung et al. |
| 6,373,573 | B1 | 4/2002 | Jung et al. |
| 6,414,750 | B2 | 7/2002 | Jung et al. |
| 6,417,917 | B1 | 7/2002 | Jung et al. |
| 6,449,041 | B1 | 9/2002 | Jung et al. |
| 6,466,232 | B1 | 10/2002 | Newell et al. |
| 6,501,542 | B2 | 12/2002 | Jung et al. |
| 6,513,046 | B1 | 1/2003 | Abbott, III et al. |
| 6,519,037 | B2 | 2/2003 | Jung et al. |
| 6,538,726 | B2 | 3/2003 | DeJung et al. |
| 6,549,915 | B2 | 4/2003 | Abbott, III et al. |
| 6,573,984 | B2 | 6/2003 | Jung et al. |
| 6,583,866 | B2 | 6/2003 | Jung et al. |
| 6,590,660 | B2 | 7/2003 | Jung et al. |
| 6,631,291 | B2 | 10/2003 | Viertio-Oja et al. |
| 6,675,159 | B1 | 1/2004 | Lin et al. |
| 6,747,675 | B1 | 6/2004 | Abbott et al. |
| 6,791,580 | B1 | 9/2004 | Abbott et al. |
| 6,801,223 | B1 | 10/2004 | Abbott et al. |
| 6,802,046 | B2 | 10/2004 | Coelho, Jr. et al. |
| 6,812,937 | B1 | 11/2004 | Abbott et al. |
| 6,842,877 | B2 | 1/2005 | Robarts et al. |
| 6,870,616 | B2 | 3/2005 | Jung et al. |
| 6,888,634 | B2 | 5/2005 | Jung et al. |
| 6,915,955 | B2 | 7/2005 | Jung et al. |
| 6,944,448 | B1 | 9/2005 | Bobst |
| 6,958,810 | B2 | 10/2005 | Jung et al. |
| 7,010,448 | B1 * | 3/2006 | Yundt-Pacheco ............ 702/85 |
| 7,019,822 | B1 * | 3/2006 | Doak et al. .................. 356/73 |
| 7,027,988 | B1 * | 4/2006 | Mohri ........................ 704/257 |
| 7,028,038 | B1 * | 4/2006 | Pakhomov .................. 707/100 |
| 7,038,786 | B2 * | 5/2006 | Blake ......................... 356/483 |
| 7,050,632 | B2 * | 5/2006 | Shilman et al. ............. 382/186 |
| 7,069,186 | B2 * | 6/2006 | Jung et al. .................. 702/188 |
| 7,119,892 | B2 * | 10/2006 | Jung et al. .................. 356/73 |
| 7,123,770 | B2 * | 10/2006 | Raghupathy et al. ........ 382/202 |
| 7,139,068 | B2 * | 11/2006 | Jung et al. .................. 356/73 |
| 7,152,029 | B2 * | 12/2006 | Alshawi et al. ................ 704/1 |
| 7,173,709 | B2 * | 2/2007 | Doak et al. ................ 356/446 |
| 7,187,452 | B2 * | 3/2007 | Jupp et al. .................. 356/501 |
| 7,197,460 | B1 * | 3/2007 | Gupta et al. ............. 704/270.1 |
| 7,218,779 | B2 * | 5/2007 | Dodge et al. ................ 382/177 |
| 7,233,950 | B2 * | 6/2007 | Smith, III .................... 707/10 |
| 7,240,839 | B2 * | 7/2007 | Jung et al. .................. 235/454 |
| 7,272,235 | B2 * | 9/2007 | Lu et al. ..................... 381/104 |
| 7,328,146 | B1 * | 2/2008 | Alshawi et al. ................ 704/1 |
| 7,336,827 | B2 * | 2/2008 | Geiger et al. ............... 382/186 |
| 7,346,628 | B2 * | 3/2008 | Porter ..................... 707/104.1 |
| 7,383,185 | B1 * | 6/2008 | Mohri ........................ 704/251 |
| 7,397,562 | B2 * | 7/2008 | Jung et al. .................. 356/419 |
| 7,397,950 | B2 * | 7/2008 | Shilman et al. ............. 382/186 |
| 7,403,285 | B2 * | 7/2008 | Jung et al. .................. 356/326 |
| 7,451,089 | B1 * | 11/2008 | Gupta et al. ............. 704/270.1 |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2002/0169595 | A1 | 11/2002 | Agichtein et al. |
| 2002/0188586 | A1 | 12/2002 | Veale |
| 2003/0046401 | A1 | 3/2003 | Abbott et al. |
| 2003/0154476 | A1 | 8/2003 | Abbott, III et al. |
| 2005/0034078 | A1 | 2/2005 | Abbott et al. |

OTHER PUBLICATIONS

System architecture and techniques for gesture recognition in unconstrained environments Kohler, M.R.J.; Virtual Systems and MultiMedia, 1997. VSMM '97. Proceedings., International Conference on Sep. 10-12, 1997 pp. 137-146 Digital Object Identifier 10.1109/VSMM.1997.622340.*

Speaker normalization with self-organizing feature maps Knohl, L.; Rinscheid, A.; Neural Networks, 1993. IJCNN '93-Nagoya. Proceedings of 1993 International Joint Conference on vol. 1, Oct. 25-29, 1993 pp. 243-246 vol. 1 Digital Object Identifier 10.1109/IJCNN.1993.713902.*

Improving the classification accuracy of the method of the moments using aspect ratio normalization Rostampour, A.R.; System Theory, 1988., Proceedings of the Twentieth Southeastern Symposium on Mar. 20-22, 1988 pp. 349-352 Digital Object Identifier 10.1109/SSST.1988.17072.*

Dynamic Cross-domain Link Creation for Interconnection of Heterogeneous Knowledge Bases Nakanishi, Takafumi; Zettsu, Koji; Kidawara, Yutaka; Kiyoki, Yasushi; Universal Communication, 2008. ISUC '08. Second International Symposium on Dec. 15-16, 2008 pp. 374-381 Digital Object Identifier 10.1109/ISUC.2008.29.*

Approaching the Interconnection of Heterogeneous Knowledge Bases on a Knowledge Grid Nakanishi, Takafumi; Zettsu, Koji; Kidawara, Yutaka; Kiyoki, Yasushi; Semantics, Knowledge and Grid, 2008. SKG '08. Fourth International Conference on Dec. 3-5, 2008 pp. 71-78 Digital Object Identifier 10.1109/SKG.2008.64.*

A knowledge sharing and collaboration system model based on Internet Wu Gangshan; Huang Yuan; Shian-Shyong Tseng; Zhang Fuyan; Systems, Man, and Cybernetics, 1999. IEEE SMC '99 Conference Proceedings. 1999 IEEE International Conference on vol. 2, Oct. 12-15, 1999 pp. 148-152 vol. 2 Digital Object Identifier 10.1109/ICSMC.1999.825224.*

Inter-agent operations in cooperating knowledge based systems Deen, S.M.; Interoperability in Multidatabase Systems, 1991. IMS '91. Proceedings., First International Workshop on Apr. 7-9, 1991 pp. 230-238 Digital Object Identifier 10.1109/IMS.1991.153713.*

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38-No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36-No. 7.

Roy Want, et al., The Active Badge Location System, ACM Transactions on Information Systems, Jan. 1992, pp. 91-102, vol. 10-No. 1.

Mark Weiser, Some Computer Science Issues in Ubiquitous Computing, Communications of the ACM, Jul. 1993, pp. 75-84, vol. 36-No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8-No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

V. Lesser, et al., "Information Gathering as a Resource Bounded Interpretation Task", UMASS Department of Computer Science Technical Report TR-97, 1997.

S. Harabagiu, et al., "FALCON: Boosting Knowledge for Answer Engines", Proceedings of Text REtrieval Conference (TREC-9), 2000.

Clarke, et al., "Exploiting Redundancy in Question Answering", SIGIR '01, Sep. 9-12, 2001, New Orleans, Louisiana, USA.

Richard J. Cooper and Stefan M. Rugar, "A Simple Question Answering System", NIST Special Publication SP, 2001.

I. Zukerman, E. Horvitz, "Using Machine Learning Techniques to Interpret WH-questions", Annual Meeting-Association for Computational Linguistics, 2001.

R. Braumandl, et al., "ObjectGlobe: Ubiquitous query processing on the Internet", The VLDB Journal 10: 48-71 (2001).

David Azari, et al., Web-Based Question Answering: A Decision-Making Perspective, Proceedings of the Nineteenth Conference on Uncertainty in Artificial Intelligence, Aug. 7-10, 2003, Acapulco, Mexico.

Eric Brill, et al., An Analysis of the AskMSR Question-Answering System, Proceedings of 2002 Conference on Empirical Methods in Natural Language Processing (EMNLP 2002), 2002.

David Maxwell Chickering, et al., A Bayesian Approach to Learning Bayesian Networks with Local Structure, Proceedings of Thirteenth Conference on Uncertainty in Artiicial Intelligence, 1997, pp. 80-89.

Charles L. A. Clarke, et al., Exploiting Redundancy in Question Answering, Proceedings of SIGIR 2001, Sep. 9-12, 2001, pp. 358-365, New Orleans, LA.

Susan Dumais, et al., Web Question Answering: Is More Always Better?, Proceedings of SIGIR 2002, Aug. 11-15, 2002, pp. 207-214, Tampere, Finland.

Sandra Harabagiu, et al., FALCON: Boosting Knowledge for Answer Engines, Proceedings of the Ninth Text Retrieval Conference (TREC-9), 2001, pp. 479-488.

Eric Horvitz, Principles of Mixed-Initiative User Interfaces, Proceedings of the ACM SIGCHI Conference on Human Factors in Computing Systems, May 1999, pp. 159-166, Pittsburgh, PA.

Cody C. T. Kwok, et al., Scaling Question Answering to the Web, Proceedings of the 10th World Wide Web Conference (WWW 10), May 1-5, 2001, pp. 150-161, Hong Kong.

Ellen M. Voorhees, et al., Overview of the Ninth Text REtrieval Conference (TREC-9), NIST Special Publication 500-249, 2001.

Ingrid Zukerman, et al., Using Machine Learning Techniques to Interpret WH-questions, Proceedings of Association for Computational Linguistics (ACL-2001), Jul. 2001, pp. 547-554, Toulouse, France.

Lin, et al. A Genetic Algorithm Approach to Chinese Handwriting Normalization. In: IEEE Transactions on Systems, Man and Cybernetics, Part B. vol. 27, issue 6, Dec. 1997, pp. 999-1007.

Ye. Artificial intelligence Approach for Biomedical Sample Characterization Using Ramam Spectroscopy. In: IEEE Transactions on Automation Science and Engineering, vol. 2, issue 1, Jan. 2005, pp. 67-73.

Hamilton, et al. Design and Implementation of a Storage Repository Using Commonality Factoring. In: Proceedings of 20th IEEE/11th NASA Goddard Conference on Mass Storage Systems and Technologies (MSST 2003), Apr. 7-10, 2003, pp. 178-182.

Wang, et al. Content Based Information Retrieval VRML 3D Objects. In: 17th International Conference on Advanced Information Networking and Applications (AINA 2003) Mar. 27-29, 2003, pp. 386-391.

Tipsuwan, et al. Analysis of Training Neural Compensation Model for System Dynamics Modelings. In: Proceedings of International Joint Conference on Neural Networks, IJCNN'01, vol. 2, Jul. 15-19, 2001, pp. 1250-1255.

Cai, et al. Development of a Name Translation System Using CRAY T94. In: High Performance Computing on the Information Superhighway, HPC Asia '97, Apr. 28-May 2, 1997, pp. 295-300.

Kohler. System Architecture and Techniques for Gesture Recognition in Unconstrained Environments. In: Proc. International Conference on Virtual Systems and Multimedia, VSMM '97, Sep. 10-12, 1997, pp. 137-146.

Knohl, et al. Speaker Normalization with Self-Organizing Feature Maps. In: Proc. International Joint Conference on Neural Networks, IJCNN '93, Nagoya, vol. 1, Oct. 25-29, 1993, pp. 243-246.

Bayle, et al. Knowledge Based System for Relational Normalization of GDBMS Conceptual Schemas. In: Proc. of the fourth Conference on Artificial Intelligence Applications, Mar. 14-18, 1988, pp. 159-165.

Rostampour. Improving the Classification Accuracy of the Method of the Moments Using Aspect Ratio Normalization. In: Proc. of the 20th Southeastern Symposium on System Theory, Mar. 20-22, 1988, pp. 349-352.

* cited by examiner

US 7,516,113 B2

COST-BENEFIT APPROACH TO AUTOMATICALLY COMPOSING ANSWERS TO QUESTIONS BY EXTRACTING INFORMATION FROM LARGE UNSTRUCTURED CORPORA

CROSS-REFERENCE TO RELATED APPLICATIONS

This application is a Continuation of U.S. patent application Ser. No. 10/635,274 filed Aug. 6, 2003, entitled, "A COST-BENEFIT APPROACH TO AUTOMATICALLY COMPOSING ANSWERS TO QUESTIONS BY EXTRACTING INFORMATION FROM LARGE UNSTRUCTURED CORPORA", the entirety of which is incorporated herein by reference.

TECHNICAL FIELD

The present invention relates generally to computer systems, and more particularly to a system and method that facilitates automated extraction of information from a heterogeneous knowledge base by applying a utility model to selectively normalize the knowledge base.

BACKGROUND OF THE INVENTION

Over the years, computer systems designers have pursued the challenge of developing computational architectures that have the ability to generate answers to freely-posed questions. General question-answering systems typically depend on automated processes for analyzing questions and for composing answers from a large corpus of poorly structured information. In recent years, systems have been developed that employ the resources of the Web as a corpus of information for answering questions. Web-based question answering systems typically employ rewriting procedures for converting components of questions into sets of queries posed to search engines, and converting query results received from the search engines into one or more answers.

Many text retrieval systems, for example, operate at the level of entire documents. In searching the web, complete web pages or documents can be returned. There has been a recent surge of interest in finer-grained analyses focused on methods for obtaining answers to questions rather than retrieving potentially relevant documents or best-matching passages from queries—tasks information retrieval (IR) systems typically perform. The problem of question answering, however, hinges on applying several key concepts from information retrieval, information extraction, machine learning, and natural language processing (NLP).

Automatic question answering from a single, constrained corpus is extremely challenging. Consider the difficulty of gleaning an answer to the question "Who killed Abraham Lincoln?" from a source which contains only the text "John Wilkes Booth altered history with a bullet. He will forever be known as the man who ended Abraham Lincoln's life." As can be appreciated, however, question answering is far easier when the vast resources of the Web are brought to bear, since hundreds of Web pages contain the literal string "killed Abraham Lincoln."

Most approaches to question answering use NLP techniques to augment standard information retrieval techniques. Systems typically identify candidate passages using IR techniques, and then perform more detailed linguistic analyses of the question and matching passages to find specific answers. A variety of linguistic resources (part-of-speech tagging, parsing, named entity extraction, semantic relations, dictionaries, WordNet, etc.) can be employed to support question answering.

In contrast to these rich natural language approaches, others have developed question answering systems that attempt to solve the difficult matching and extraction problems by leveraging large amounts of data. In one such system, redundancy provided by the web can be exploited to support question answering. Redundancy, as captured by multiple, differently phrased answer occurrences, facilitates question answering in two key ways. First, the larger the information source, the more likely it is that answers bearing close resemblance to the query can be found. It is quite straightforward to identify the answer to "Who killed Abraham Lincoln?" given the text, "John Wilkes Booth killed Abraham Lincoln in Ford's theater." Second, even when no exact answer can be found, redundancy can facilitate the recognition of answers by enabling procedures to accumulate evidence across multiple matching passages. In order to support redundancy however, a plurality of variously phrased queries may have to be submitted to one or more search engines. This type of approach may place an unacceptable performance burden or load on search engines responding to the query especially considering the number of users that potentially utilize network resources.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods to automatically extract information from large unstructured or semi-structured heterogeneous corpora such as a knowledge base of local and/or remote data stores of information, or the entire World Wide Web. A normalization component employing a statistical model of the likelihood that different information retrieval operations will be valuable and a utility model is provided to characterize the information value of different kinds of retrievals from the knowledge base. The characterizations are used to control in a dynamic manner processes that extract or glean unseen, previously unknown, and/or disassociated information from the knowledge base. For example, the knowledge base may include a plurality of web sites that are interconnected across the Internet.

Questions or queries posed by a user to an interface component (e.g., web service) are automatically reformulated into a determined subset of queries or other types of information-gathering operations, wherein the utility model performs a cost-benefit analysis to control and optimize potential reformulated queries that are submitted to the knowledge base (e.g., one or more search engines accessing databases) in order to obtain answers to the questions. In this manner, unstructured databases having individual components of information are normalized to find/connect the components in order to provide previously unknown information to users such as in the form of an answer to a specifically worded question.

The cost-benefit analysis considers and balances the cost of acquiring new information, e.g., via submitting additional reformulated queries, versus the benefit or value of receiving a more accurate answer to a question posed by the user, by integrating new information acquired from the acquisition. By dynamically balancing or optimizing these considerations, back-end search processing for answers can be enhanced while achieving desired results when determining answers (e.g., performance of search engines enhanced by processing less queries). Also, preference tools can be provided to enable users to provide input relating to assessments of costs for retrieving information and the value placed on obtaining more accurate answers to questions.

In one particular aspect of the present invention a Web-centric question-answering system is provided although the present invention can be applied to substantially any type of heterogeneous knowledge base. A layer or layers of probabilistic analysis and learning can be applied to guide extraction of information from the Web in a Web-centric question answering system or service, for example. One or more phases of machine learning can be employed to build Bayesian models that predict the likelihood of generating an accurate answer to questions along with coupling such predictive models with considerations of the value and costs of various web-querying actions.

Other aspects of the present invention include extending decision-making considerations to mixed-initiative interaction, wherein decision models consider real-time input from users to refine or reformulate questions (e.g., dialog component to ask users to reformulate questions). Thus, beyond selecting the best web-querying actions to take, the present invention can include cost-benefit analyses that considers when it would be best to ask a user to reformulate a question rather than expending effort on processing a query that may be expensive or likely to yield inaccurate results. In such an analysis, an assessment of the cost of delay and effort associated with a query reformulation and the likelihood that a reformulation would lead to a better result can be considered and modeled.

The predictive power of models of answer accuracy can be enhanced by considering additional features of questions and query rewrites, and extending inference methods to acquire or reason about notions of topic, informational goals, and overall context of a user posing a question. This can include enhancing models for predicting topic and high-level intentions associated with questions from tagged libraries of questions, posed by users of online encyclopedias and/or other information sources. The models can provide predictions of the high-level information goals, topic, and desired level of detail of users, based on parts of speech and logical forms provided by a Natural Language Processor parse of questions.

Beyond extending probabilistic models of accuracy and expected value analysis, question-answering systems in general can be refined in several ways. Refinements include introducing new variants of query rewrites and modifying methods for combining search results into candidate answers. In addition to guiding real-time question-answering procedures, decision-analytic evaluative and control machinery can serve as a tool or service, enabling systems to probe in an explicit manner the utility of making specific modifications to question-answering systems.

In a broader aspect, the present invention includes methods for introducing a "normalizing layer" of probabilistic analysis of accuracy coupled with utility-guided query control for guiding the extraction of information from the Web and/or other knowledge base, in support of a variety of tasks requiring information synthesis from large, unstructured corpora.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to a system and methodology to facilitate information extraction and learning from an unstructured corpora of information. This information can be retrieved from local and/or remote databases that house such information (e.g., web sites, local databases, electronic encyclopedias or dictionaries). In one aspect of the present invention, a normalization system is provided. The normalization system includes an interface component that receives data corresponding to a heterogeneous knowledge base such as from web sites or other sources. A normalization component applies a statistical or logical model that relates the expected accuracy or quality of answers to sets of information-acquisition actions, and a utility model capturing the costs and benefits associated with information extractions, to provide a regularized understanding of the value of extracting information from the knowledge base. The utility model is employed to provide dynamic controls for obtaining information relating to the costs of seeking the information versus the value of obtaining more accurate information. A preference tool or interface can be provided to aid in the assessment of respective costs and benefits for obtaining the information.

As used in this application, the terms "component," "service," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic; that is, the computation of a probability distribution over states of interest based on a consideration of data and events. Inference can also refer to logical techniques, such as rule-based policies, or compositional rules employed for composing higher-level events from a set of more atomic, lower-level events and/or data. Such inference results in the construction of new assessments, labels, assignments, or events or actions from a set of observed events and/or stored event data, whether or not the events are correlated in close temporal proximity, and whether the events and data come from one or several event and data sources.

Figure 1:
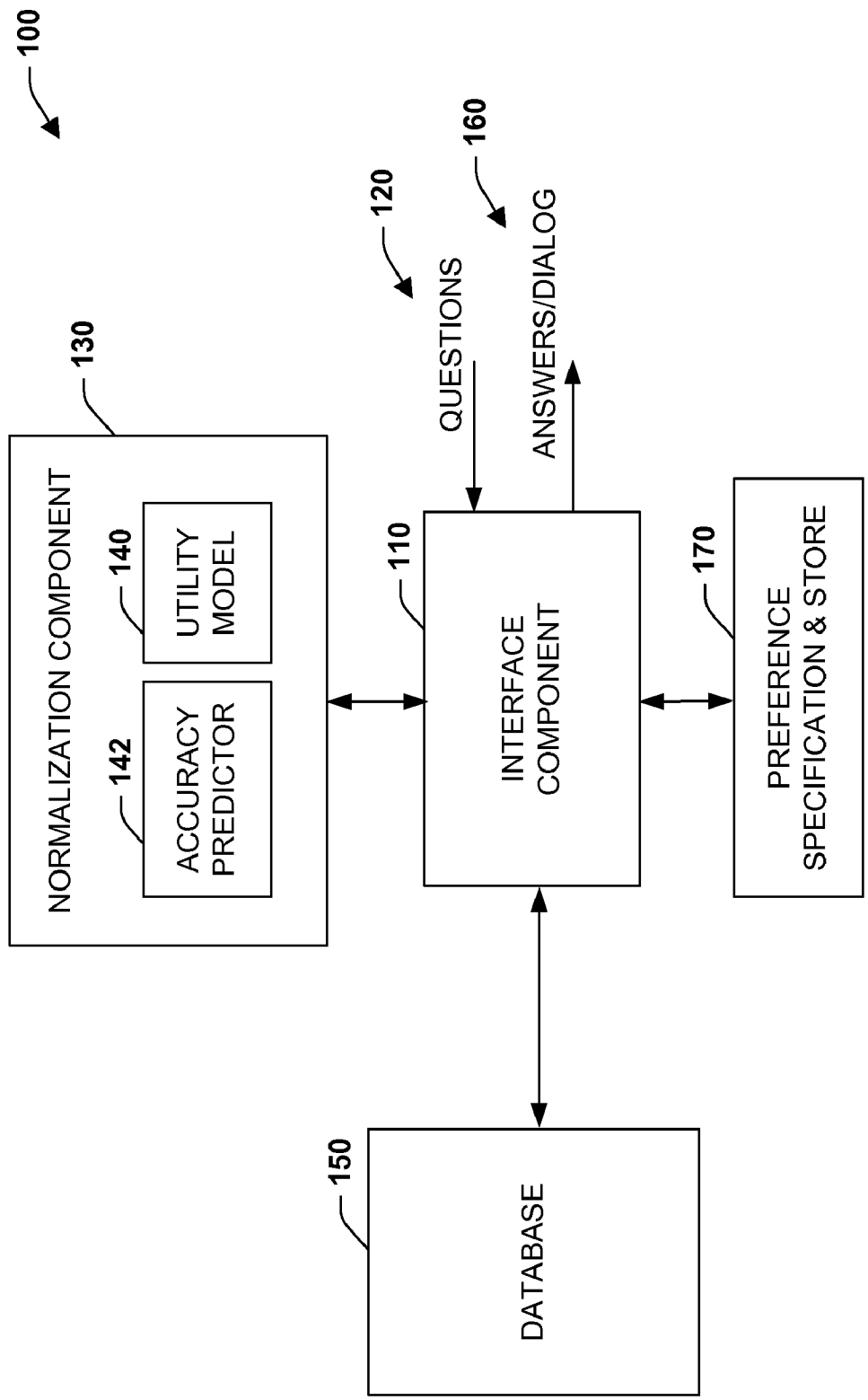
FIG. 1 is a schematic block diagram of a normalization system employing a utility model for extracting information from an unstructured corpora in accordance with an aspect of the present invention.

Referring initially to FIG. 1, a normalization system 100 employing a utility model for extracting information from an unstructured corpora is illustrated in accordance with an aspect of the present invention. An interface component 110 is provided that receives questions 120 posed by users. The questions 120 are processed in accordance with a normalization component 130 that employs one or more predictive models that provide estimates of how different information extractions will enhance the accuracy of answers, and a utility model 140 that captures the costs and benefits of taking the information-extraction actions. The predictive models can also include an accuracy predictor 142 that can be employed in conjunction with the utility model 140. These components can be viewed as providing machinery that normalizes the system's understanding of how to interact with a potentially heterogeneous, ill-structured database 150 (also referred to as a knowledge base). The normalization process includes applying the utility model 140 and/or accuracy predictor 142 to dynamically control extraction of previously unknown or disassociated information from the database 150. For example, this can include reformulating the question 120 into an alternative set or subset of queries and controlling the number of queries submitted to the database 150 given various decision-theoretic considerations that are described in more detail below. It is noted that the database 150 can include closed system environments such as from a local databases, systems, files, directories, and/or sources such as an electronic encyclopedia, dictionary, or other information source. Also, the database 150 can include open system sources such as provided by remote web sites and/or other databases/sources (e.g., local/remote Intranet sites/databases associated with an entity).

In general, the utility model 140 applies a cost-benefit analysis to dynamically control the number and types of attempts made to acquire information or answers 160 from the database 150 in response to the question or questions 120. As will be described in more detail below, this includes an analysis of the costs of searching for information versus the benefits or value of obtaining more accurate answers to the questions 120. In addition to supplying answers 160, the interface component 110 may also initiate dialog with users at 160. Such dialog may be initiated by a dialog component (not shown) based upon predetermined probability thresholds or other criteria that can also include a cost-benefit analyses that considers when it would be best to ask a user to reformulate a question rather than expending effort on handling a query that may be expensive (in terms of searching for information from the knowledge base) or likely to yield inaccurate results. In such an analysis, an assessment of the cost of delay and effort associated with a query reformulation and the likelihood that a reformulation would lead to a better result can be considered and modeled. Also, the dialog component can make a decision when to engage a user to request a reformulated question or additional information. This can include alerting or warning the user about the cost of receiving a good answer, or recommending that a query be attempted elsewhere (e.g., a human expert). In order to determine respective costs and/or benefits, a preference specification and store 170 may be provided that enables users to assess or select various parameters that influence the utility model 140 which is described in more detail below with respect to FIG. 2.

Figure 2:
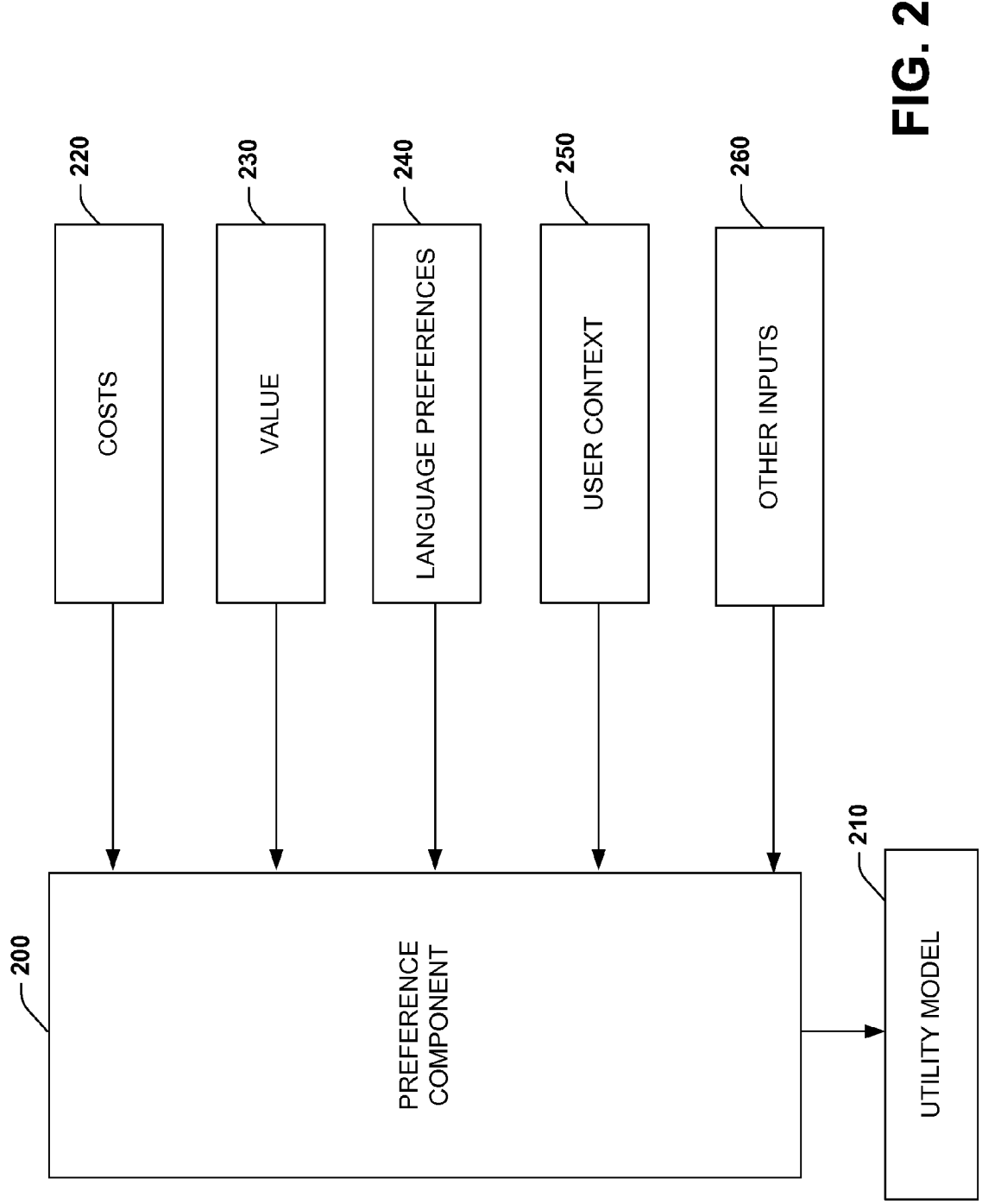
FIG. 2 is a diagram of a preference component and utility model in accordance with an aspect of the present invention.

Referring to FIG. 2, the relationship between a preference component 200 and utility model 210 is illustrated. The preference component 200 can be presented in the form of a Graphical User Interface to enable users to select and/or alter parameters that may affect the utility model 210. These inputs can include costs 220 that can be expressed in dollar amounts (or other meaningful parameter representing cost). Also, value amounts 230 can be expressed representing a parameter expressing the user's desire for accuracy in a respective answer. Other preferences may include language preferences 240 that indicate the type of languages the user desires to employ and thus, receive answers (e.g., English, German, Spanish, and so forth). At 250, a user context component is provided that can include such inputs as a user's current location, velocity, actions with a computing device (e.g., current speed of application switching, typing, recent history of a user's queries, recent text generated by user, etc.), calendar (e.g., deadline coming up), as well as high-level inferences about a user's goals from multiple features, including those described below. Still other preference inputs 260 may be provided which are described in more detail below. After preferences have been established, the utility model 210 is then applied to normalize the knowledge base described above such as in controlling the numbers of reformulated queries that are submitted to search engines.

In controlling the number of queries relayed to a search engine, preferences about the costs of sending increasing numbers of queries and the benefits of a more accurate answer are determined. Several models for representing costs and benefits are feasible. In one example, a model where a user assesses a parameter v, indicating the dollar value of receiving a correct answer to a question, and where a parameter c represents the cost of each query rewrite submitted to a search engine can be employed. Rather than asserting a constant value for receiving an answer to a question, a user may consider the value of receiving an answer as a function of the details of the situation at hand. For example, the value of an answer may be linked to the type of question, goals, and the time of day for a user.

Similarly, the cost of submitting queries can be a function of such factors as the as the current load sensed on a search engine or the numbers of queries being submitted by a user's entire organization to a third-party search service, for example. The costs may also scale non-linearly with increasing numbers of queries. For example, the first n queries may be considered free by a search service supporting the question-answering systems at an enterprise, after which expenses are incurred in a supra-linear manner.

Models that output the probability of retrieving a successful answer, conditioned on different numbers of query rewrites, enable computing an expected value of submitting the queries. If the value of not receiving a valid answer is taken as zero, the expected value of submitting n queries is the product of the likelihood of the answer, given evidence E about the query, $p(A|E,n,\xi)$, and the value of obtaining a correct answer $v$, $p(A|E,n,\xi)$ $v$.

In one example, consider a preference model where the value of an answer, $v$, is assessed in terms of the cost of queries, $c$. That is, assess the value of answers as some multiple $k$ of the cost of each query $c$, $v=kc$. Also assume a cost model that grows linearly with the number of queries, $nc$. In making decisions about the ideal number of queries to submit, optimize a net expected value, computed as the difference of the expected value and cost, for different $n$. Thus, it is desired to find the ideal $n$, $$n^* = \arg\max_n p(A|E,n,\xi)kc - nc.$$

As noted above, question/answering systems can be extended with a utility model and/or models of accuracy (described below) as a function of the number of queries submitted, and these systems can check each quantity of query rewrites explored in machine learning studies to identify an optimized number of queries to submit.

Figure 3:
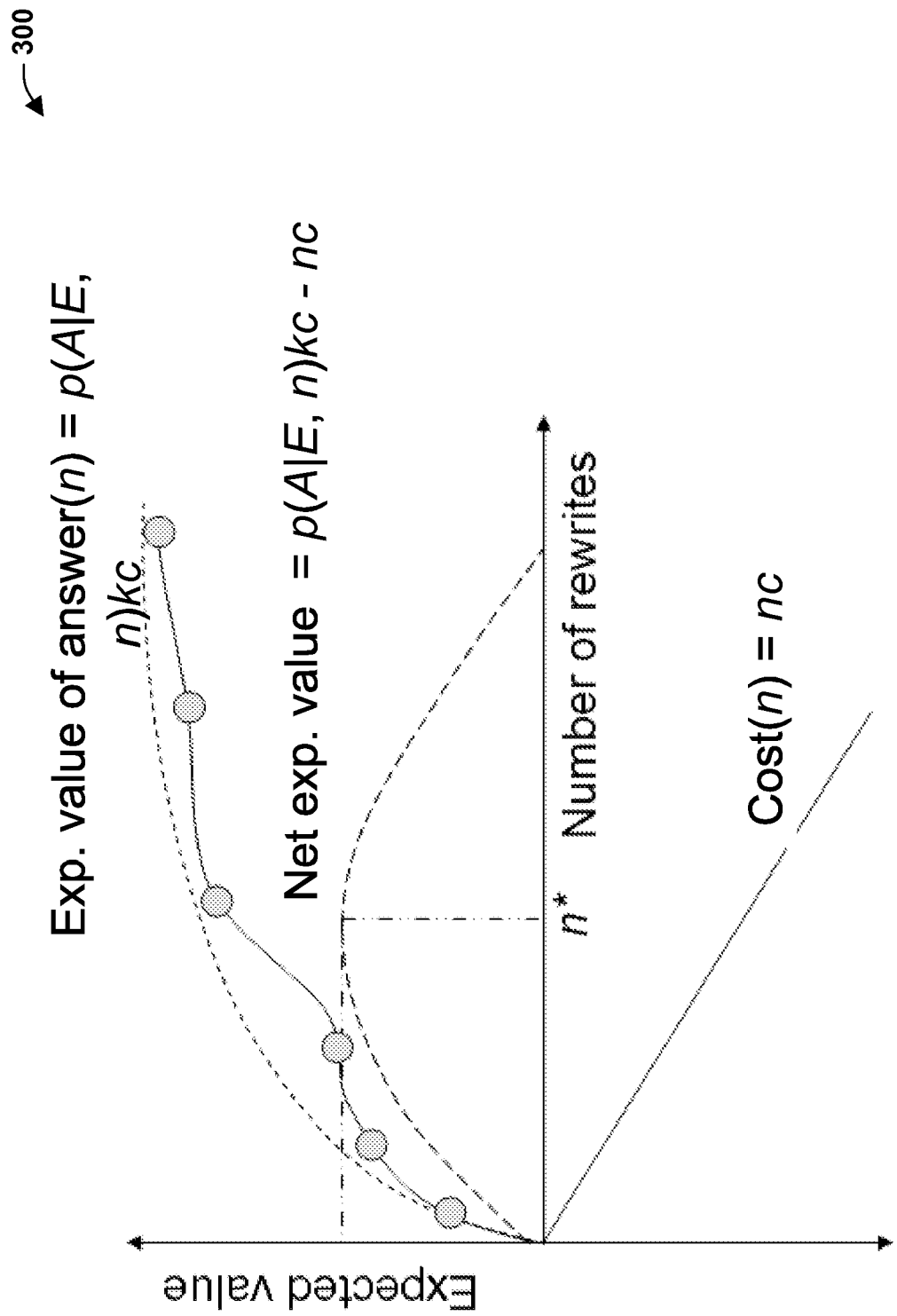
FIG. 3 is a diagram illustrating an idealized cost-benefit model in accordance with an aspect of the present invention.

FIG. 3 is a diagram 300 illustrating an idealized view of a cost-benefit analysis where the probability of an answer grows with decreasing marginal returns with additional queries. The expected value, cost, and net expected value are displayed as a function of the number of queries submitted. If there were smooth decreasing marginal returns on accuracy with increasing numbers of queries, n* could be identified from the derivatives of the curves. As indicated in FIG. 3, the ideal number of queries to issue is obtained at a position on the x-axis where the change in expected value of the answer is equal to the cost of each query. In reality, given potential non-monotonicity of the expected value curve, the number of queries associated with each learned model is evaluated.

Figure 4:
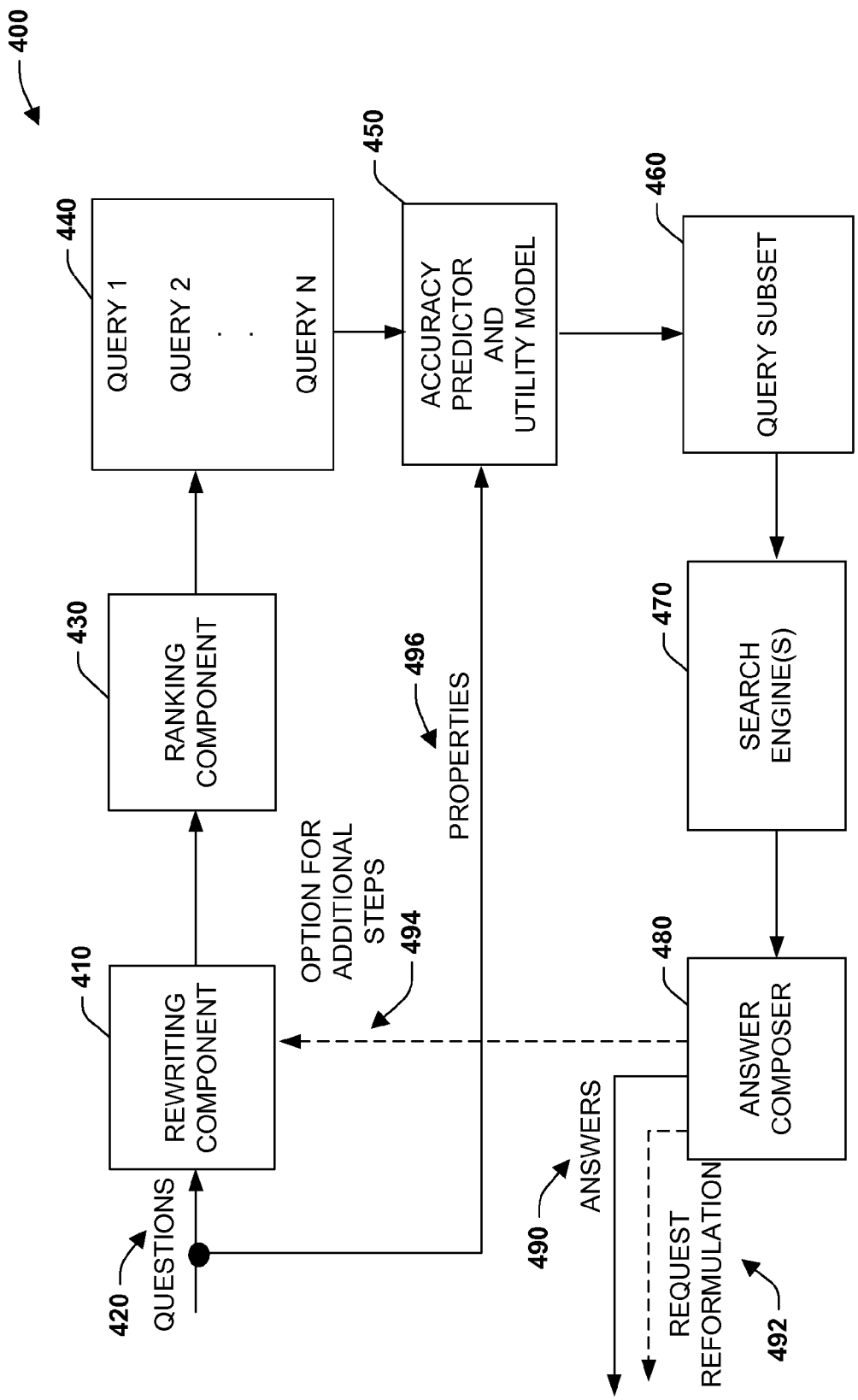
FIG. 4 is a schematic block diagram illustrating a multi-tiered question/answering system in accordance with an aspect of the present invention.

FIG. 4 illustrates a multi-tiered question/answering system in accordance with an aspect of the present invention. A rewriting component 410 receives questions 420 and submits the questions in reformulated terms described below to a ranking component 430. The ranking component 430 employs a first tier of learning models to order reformulated queries 440 in an order of likelihood of providing a suitable answer. The models can be trained from a training set of data that is described in more detail below.

When the reformulated queries have been ordered according to the probability of obtaining a correct answer, a utility model and accuracy predictor 450 such as described above is employed to form a query subset 460 which is then submitted to one or more search engines 470. Results returned from the search engines 470 are processed by an answer composer 480 that generates a formatted answer or answers 490 in response to the question 420. A request formulation 492 may also be submitted to request that a user reformulate a question 420 (or try searching somewhere else e.g., ask a human expert), or to warn the user about the cost of continuing. At 494, system feedback may be employed to perform additional steps that form a multistage analysis that takes results from a previous cycle of analysis into consideration. Also, one or more properties 496 from the questions 420 may be analyzed by the utility model and accuracy predictor 450 when determining the query subset 460. The following discussion describes one possible implementation for the system 400. It is to be appreciated that various implementations are possible (e.g., various components combined into single component, some components operating on remote systems, and so forth).

The system 400 reformulates user questions 420 or queries into likely substrings of declarative answers to the question. For each query, several rewrites are generated using eight rewrite heuristics (or other number). The rewrites vary from specific string matching to a simple "ANDing" of the query words. As an example, for the query "Who killed Abraham Lincoln?" there can be three rewrites: <LEFT> "killed Abraham Lincoln"; "Abraham Lincoln was killed by" <RIGHT>; and who AND killed AND Abraham AND Lincoln. <LEFT> and <RIGHT> refer to the likely placement of candidate answers.

The first two rewrites generally require that a text on the Web or knowledge base match the exact phrase, such as "killed Abraham Lincoln." The last rewrite is referred to as a conjunctional back-off strategy, as it "ANDs" together all the query words, leading to less specific queries. The rewrite strings are formulated as search engine queries and sent to a search engine from which page summaries are collected. Any search engine can be used as the provider of results to a second stage of analysis. The system 400 can assign heuristic scores to results of different types of rewrites. For example, the system assigns higher weights to results of more precise rewrites than it does to the more general back-off rewrite. Several phases of analysis can be employed to identify answers to questions from the results returned by searches with query rewrites and may include one or more of the following:

Mine N-Grams. From page summaries returned for query rewrites, all unigram, bigram and trigram word sequences are extracted. The n-grams are scored according to their frequency of occurrence and the weight of the query rewrite that retrieved it. As an example, the common n-grams for the example query about the assassination of Abraham Lincoln are: Booth, Wilkes, Wilkes Booth, John Wilkes Booth, bullet, actor, president, Ford's, Gettysburg Address, derringer, assignation, etc.

Filter N-Grams. The n-grams are filtered and re-weighted according to how well each candidate matches the expected answer type, as specified by fifteen handwritten filters (or other number). These filters utilize surface-level string features, such as capitalization or the presence of digits. For example, for When or How many questions, answer strings with numbers are given higher weight, and for Who questions, answer strings with capitals are given added weight and those with dates are demoted.

Tile N-Grams. The n-grams are tiled together by lining up matching sub-phrases where appropriate, so that longer answers can be assembled from shorter ones. Following tiling, the answers to the example query are: John Wilkes Booth, bullet, president, actor, Ford. John Wilkes Booth receives a higher score than the other answer candidates because it is found in matches to specific rewrites and because it occurs often overall.

To limit the number of queries issued by the system 400, the expert-derived heuristic functions described above are replaced with Bayesian models that can generate probabilities of answer success. In an initial phase of analysis, models are employed that provide a ranking of individual queries. Bayesian learning procedures can be employed to generate models that can infer the probabilistic lift that queries of different types can yield the likelihood of an accurate answer. Such models provide a normalized metric for ordering sets of queries by their goodness or suitability, providing a decision surface for deliberating about the costs and benefits in a more global analysis of the end-to-end performance of the overall system.

Queries are generally separated into two categories: (1) queries that involve ANDing of individual words and occasionally short phrases (e.g., population AND "of Japan"), and (2) queries that contain a single phrase (e.g., "the population of Japan is"). The former is referred to as conjunctional rewrites. The latter is referred to as phrasal rewrites. These two sets of queries are associated with distinct evidential features, which are considered during modeling. For both types of rewrites, such features as the number of distinct words and the number and percentage of stop words present in the queries are considered. For building predictive models of the goodness of phrasal rewrites similar features were also examined, but also included features derived from a statistical natural language parser for English text.

The syntactic parser constructs multiple parse trees, capturing multiple hypotheses for an input string, based on a consideration of the likely different parts of speech that words in a phrase can have. After producing all hypotheses, the parser employs a language model to rank the likely syntactic hypothesis, computing probabilities of each parse tree as the product of the probability of all of the nodes in the tree. Several features output by the parser were considered including the number of primary and secondary parses and the maximum probability parse tree, or a measure of grammatical "goodness" of a query rewrite. A list of the features used for both sets of query rewrites is listed in Tables 1 and 2.

TABLE 1

Features of conjunctional and phrasal rewrites considered in learning models of query goodness.

LONGPHRASE: The longest phrase in the rewrite, in terms of words.
LONGWD: The length of the longest word in the entire query.
NUMCAP: The number of capitalized words in the entire query.
NUMPHRASES: The total number of phrases in the overall query.
NUMSTOP: The number of stopwords in the entire query, using our list.
NUMWORDS: The number of words in the entire query string.
PCTSTOP: Percentage of stop words.

TABLE 2

Features used only for phrasal rewrites considered in learning models.

NUMCAP, NUMSTOP, PCTSTOP: as above.
PRIMARY_PARSES: The number of primary parses given by the natural language parser.
SECONDARY_PARSES: The number of secondary parses given by the natural language parser.
SGM: The "statistical goodness" of the rewrite; a measure of how grammatical the sentence or phrase is, given by the parser.

A Bayesian-network learning tool, named the WinMine was employed (Chickering et al. in a publicly available paper on the Internet or other sources entitled "A Bayesian Approach to Learning Bayesian Networks with Local Structure" (MSR-TR-97-7, Aug. 1997) to learn Bayesian networks and decision trees for the query rewrites. To generate a set of queries for building models of query goodness, the system 400 was executed on questions included in a training data set. This data set includes a set of questions and correct answers used for evaluating the performance of question-answering systems (e.g., Trec9 data set).

It is noted that other types of features, modeling, and analysis may be employed in accordance with determining answers and/or providing information to users. For example, the use of full text and/or text summaries (short snippets) of articles may be analyzed and returned by a knowledge base (e.g., search engine). Also, automated processes can include the process of learning logical or statistical predictive models that predict the accuracy or quality of answers as a function of the nature or number of queries issued to a knowledge base. Similar to above, Bayesian learning procedures can be employed to learn the models. Furthermore, other features can be considered, including higher-level features such as the distribution of topics associated with the results of queries (e.g., as can be identified with a statistical classifier that assigns topics based on text being analyzed), and tags derived from natural-language parses of the initial questions, and the text of results or the text of snippets returned from results, as well as higher-level informational goals of the user, as derived from assessing goals directly, or as inferred from an analysis (e.g., NLP analysis) of the user's initial question.

It is also noted that features can be analyzed in terms of classes of features, including attributes and statistics of attributes of morphological or semantic aspects of initial (1) question and/or (2) one or more query results, including words and phrases, parts of speech, structure of natural language parse, length, topics and distribution of topics, and inferred or assessed informational goals or intentions.

Figure 5:
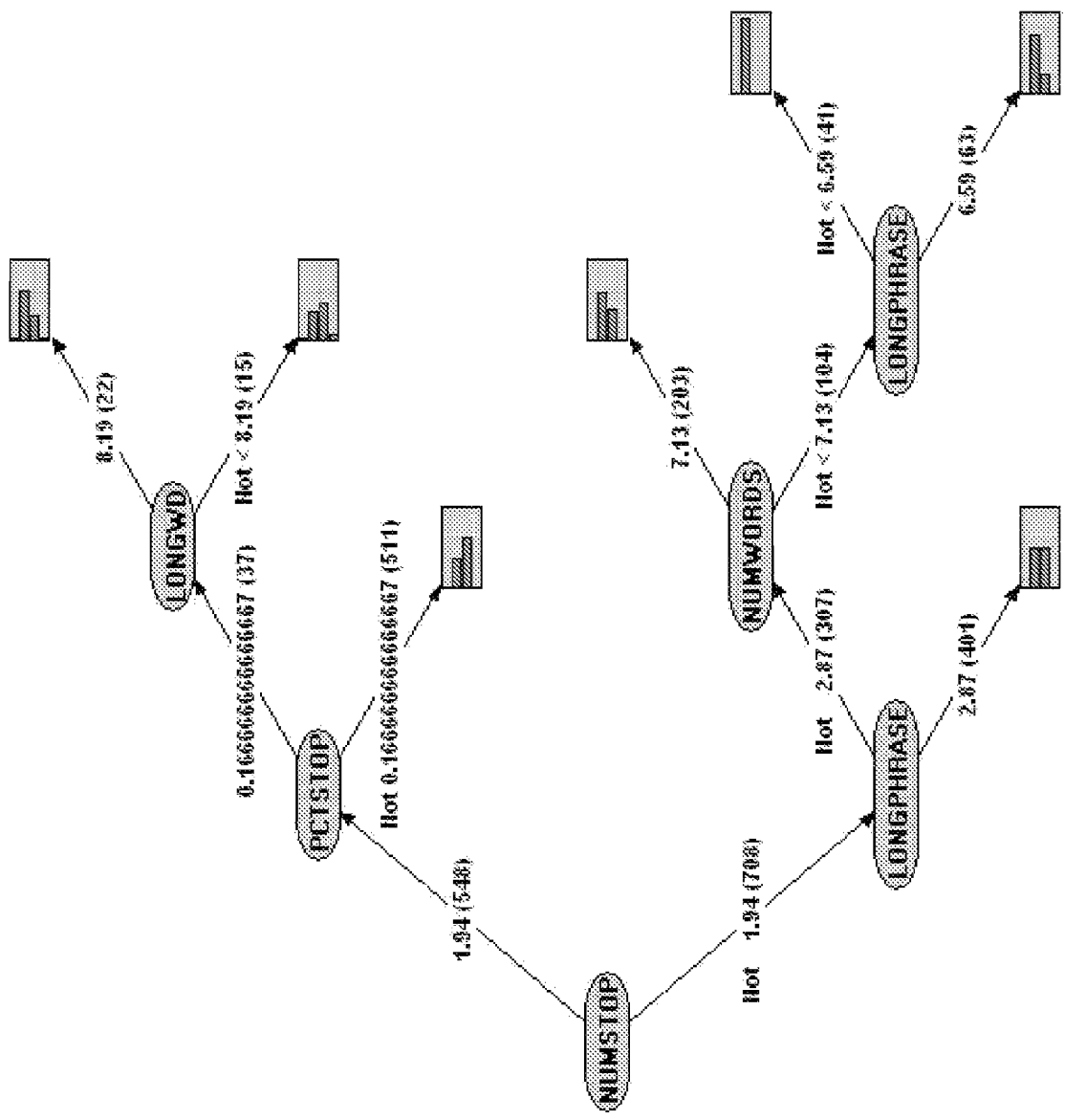
FIGS. 5-7 illustrate various decision trees for determining the success and numbers of queries in accordance with an aspect of the present invention.
Figure 6:
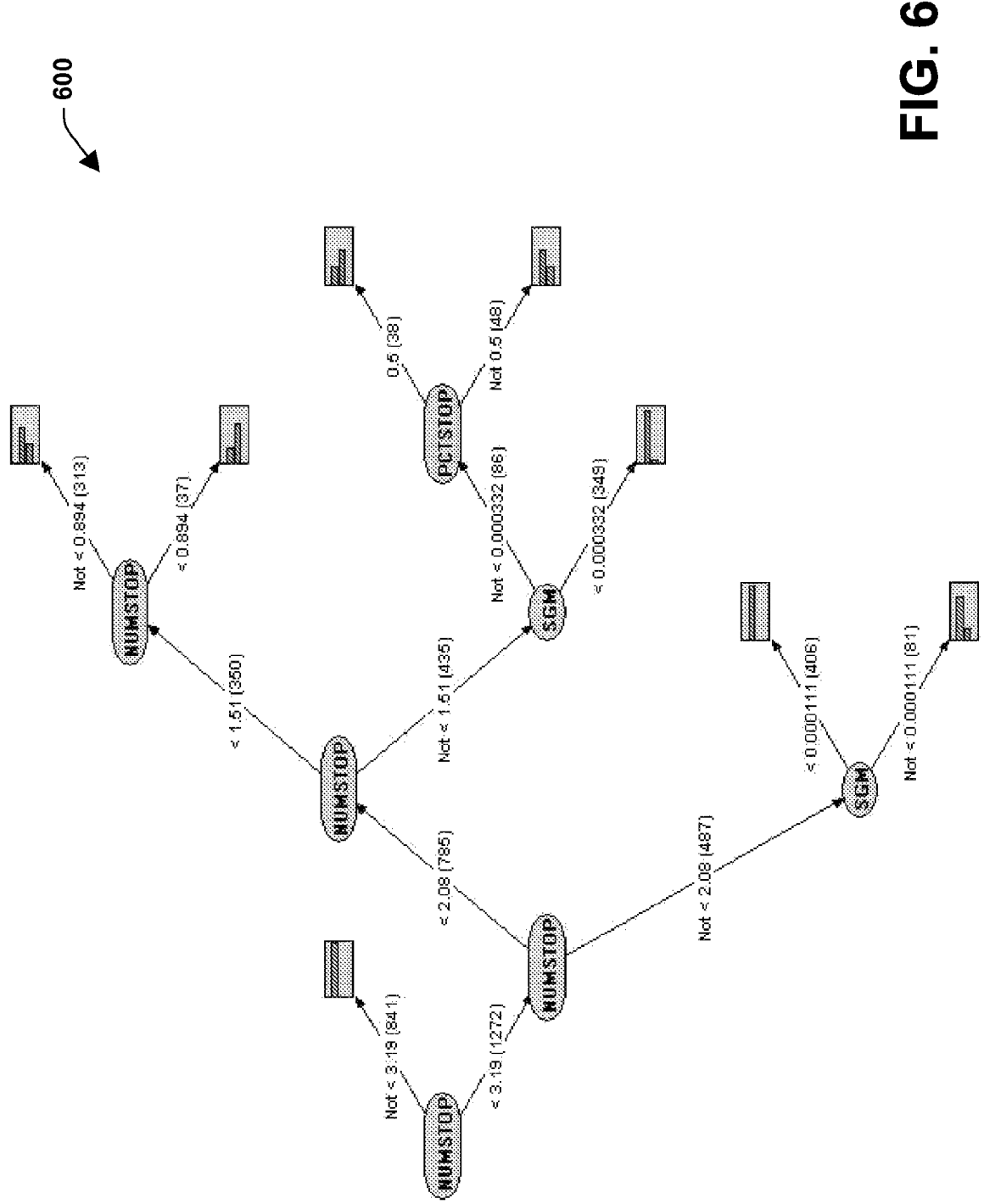

FIG. 5 displays a decision tree 500 derived from a Bayesian model that maps properties of conjunctional rewrites to an expected accuracy. FIG. 6 depicts a model 600 for phrasal rewrites. These models provide a probabilistic score for judging the value of specific rewrites towards attaining a correct answer. The scores are heuristic in that the system does not employ single queries in normal operation, but utilizes ensembles of queries.

After an initial analysis, yielding models of the usefulness of individual rewrites, a second phase of analyses, employed machine learning to build Bayesian models of the relationship between the ultimate accuracy of processing of questions and the numbers of queries submitted to a search engine, considering the properties of the question at hand. Such models enable cost-benefit analyses, trading off the expected gains in accuracy of an answer and the costs of additional queries. These analyses provide making dynamic decisions about the number of queries to submit to a search service—and to make decisions about when to forego an analysis and, instead, to ask a user to reformulate their question. An ensemble of models was constructed by generating cases via a process of running the system on sample questions and applying different fixed thresholds on the number of rewrites submitted to search engines, as ordered by the goodness of queries established in the first phase of model construction. Additional features employed in model construction are illustrated in Table 3. It is noted note that these thresholds did not always result in the total number of rewrites being submitted because some questions generated fewer rewrites than the threshold values would allow.

TABLE 3

Features considered by the models for choosing rewrite thresholds for a given question-answering run.

AVERAGE_SNIPPETS_PER_REWRITE: Snippets are the summaries collected from web pages for a given query.
DIFF_SCORES_1_2: The difference between the first and second highest scored answer from AskMSR's scoring heuristic.
FILTER: The filter applied to the original query, such as "nlpwin_who_filter".
FILTER2: These are very particular filters that focus on words and bigrams...
MAXRULE: Scores are given at the reformulation stage, based on the filter used to generate rewrites. This is the highest score procured for a particular query.

TABLE 3-continued

Features considered by the models for choosing rewrite thresholds for a given question-answering run.

NUMNGRAMS: The overall number of ngrams mined from snippets.
RULESCORE_X: Number of ngrams for rules with score X.
STD_DEVIATION_ANSWER_SCORES: The std. deviation amongst the top five answer scores from AskMSR's heuristic.
TOTALQUERIES: Total queries issued after all rewrites.
TOTNONBAGSNIPS: Total snippets generated from phrasal rewrites.
TOTSNIPS: Total snippets for all rewrites.

Figure 7:
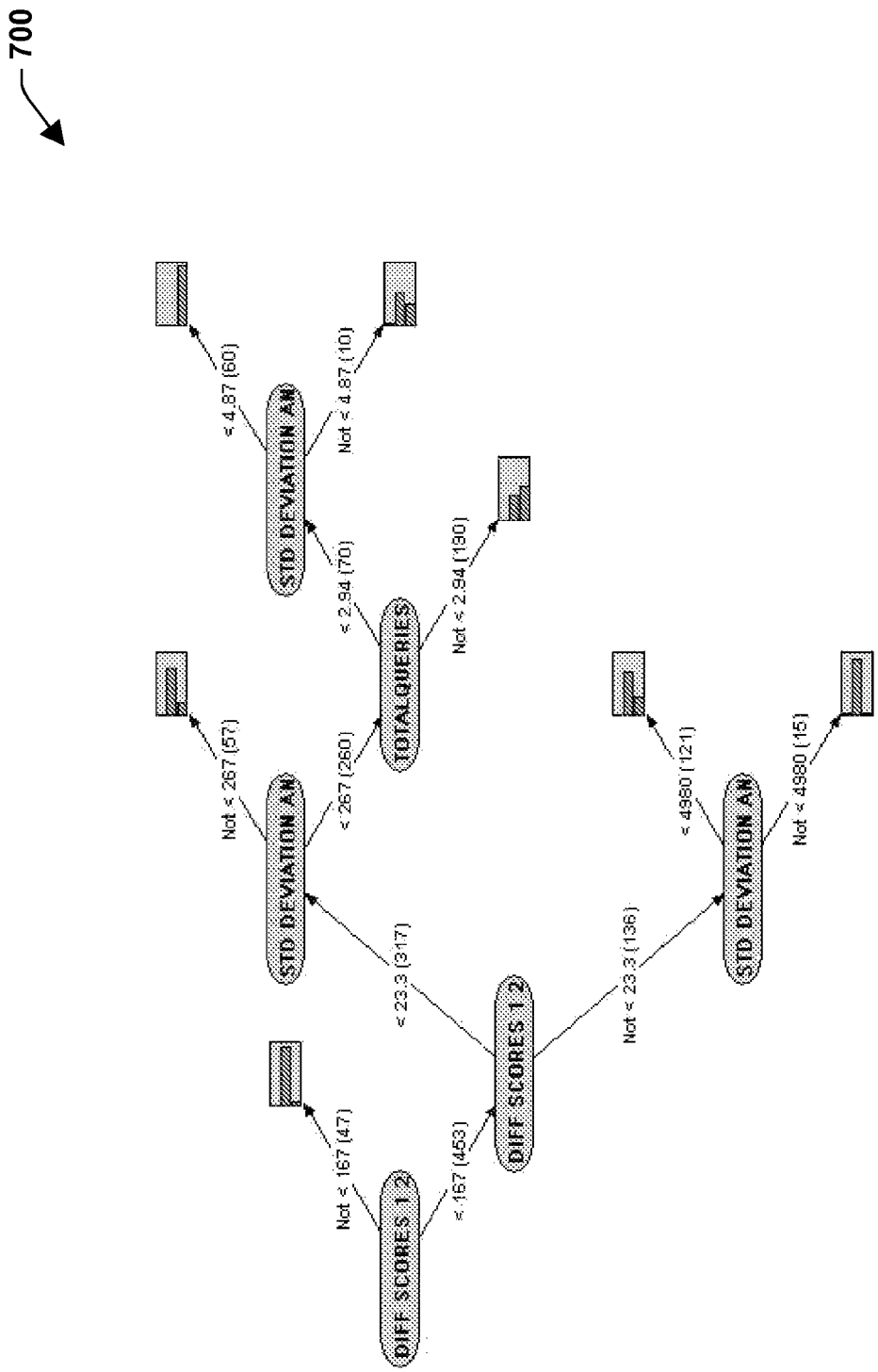

The number of queries were discretized into fixed thresholds at 1-10, 12, 15, and 20 rewrites per question, thus building thirteen models (other numbers can be employed). The models generated by this process provide predictions about the overall accuracy of answers to questions at increasingly higher levels of thresholds on query rewrites submitted to a back-end search engine. FIG. 7 displays a decision tree 700 learned from data about the performance of question answering when limiting submitted queries to 10 rewrites.

The following describes results of experiments that were conducted to measure performance of the normalization components described above. A set of experiments were performed on the systems described above. Given a query, query rewrites are first sorted into a list by single-query models. Then, an ensemble of Bayesian models for different numbers of rewrites are employed in conjunction with a utility model to select the best number of rewrites to issue to a search engine (or engines). The search results are then passed to an answer composition stage. The available actions are defined by the end-to-end performance models which were trained for 1-10, 12, 15, and 20 rewrites.

Figure 8:
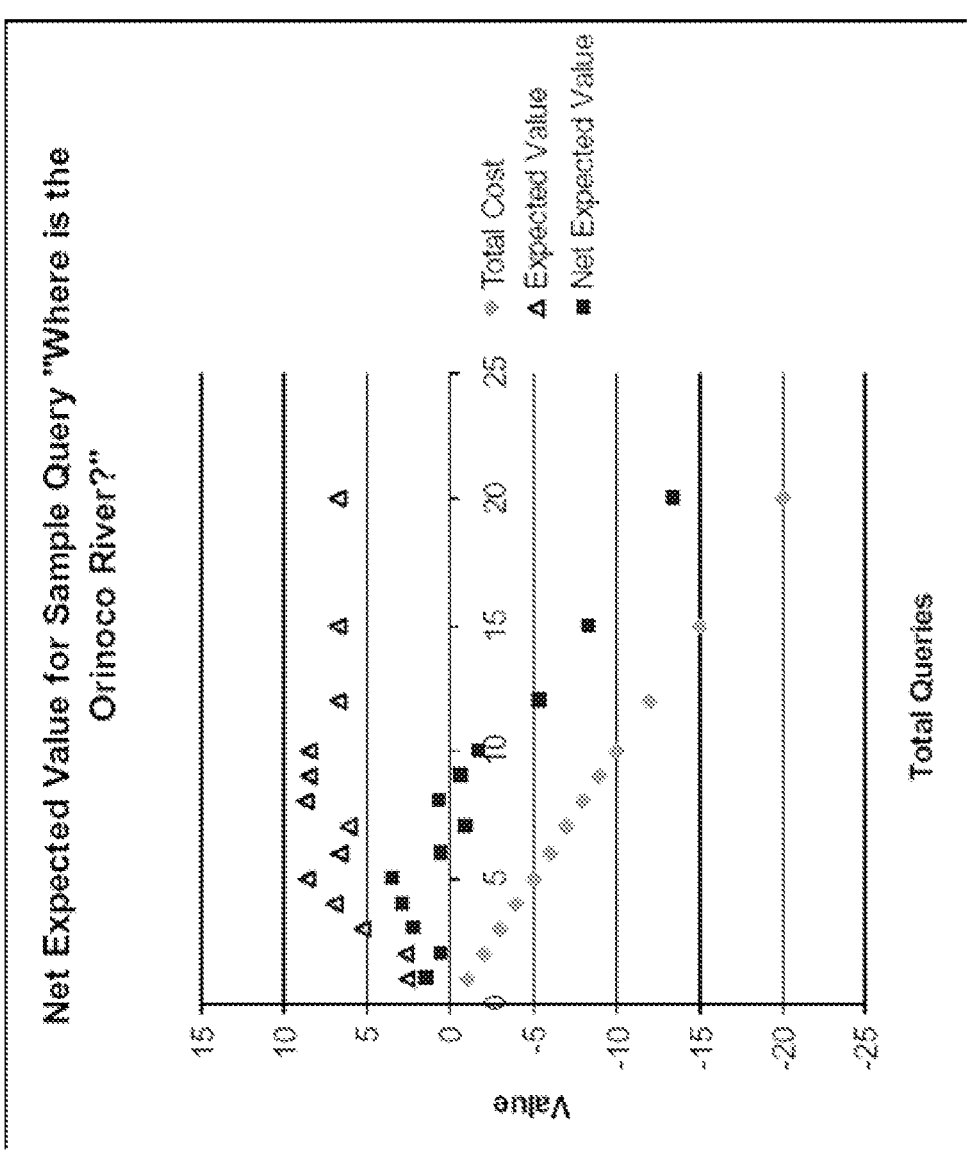
FIGS. 8 and 9 illustrate example cost-benefit models in accordance with an aspect of the present invention.
Figure 9:
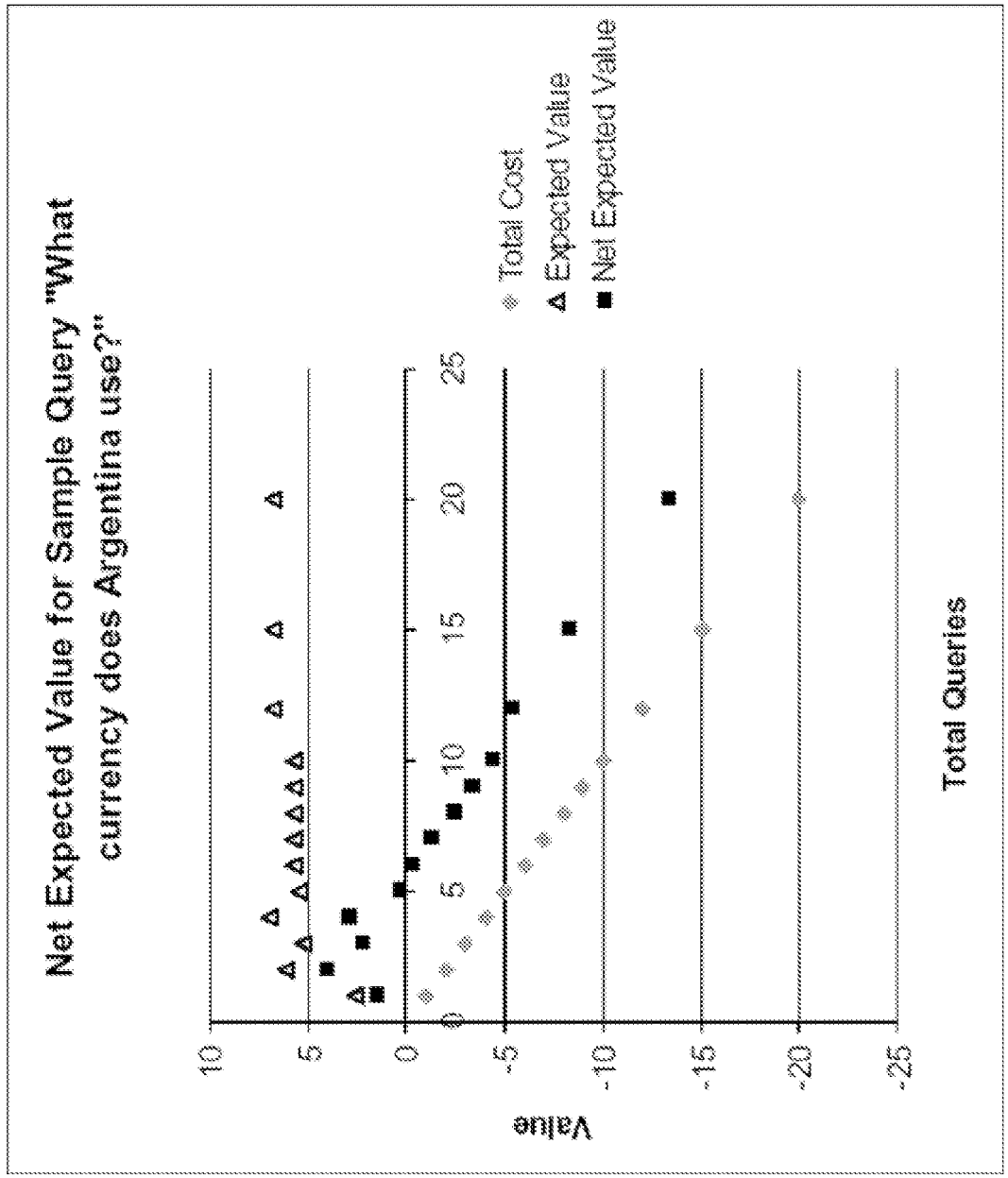

FIG. 8 shows a cost-benefit analysis graphically for an example query "Where is the Orinoco River?," with a cost per query of 1 and a correct answer valued at 10. In this case, the best decision available is to choose to submit 5 query rewrites. FIG. 9 displays cost-benefit analysis for a query, "What currency does Argentina use?" for the same preference settings. With this policy, it is best to send 2 query rewrites to the search engine. Table 4 below shows the performance of the system with cost-benefit policies over different baseline policies. In these fixed-cost runs, the system is given a ceiling on the number of query rewrites it can use.

In a first set of experiments, the system chooses randomly from rewrites available for each query up to a threshold (N). In a second set of experiments, the system was executed with a static policy of selecting N rewrites from a list of query rewrites, ranked by a probabilistic query-quality score described above. A ceiling of 20 rewrites is roughly equal to the policy in a legacy system, which had no limitation on rewrites, as only a few queries yield more than 20 rewrites. As highlighted in the table of results, sequencing queries by the query-quality score dominates the randomly ordered queries, demonstrating the value of using the query-quality score.

Ranked query rewrites for cost-benefit analysis were also employed. Table 5 compares the policy chosen by the cost-benefit analysis with two fixed policies, one using only conjunctional rewrites (top row) and the other using all rewrites (bottom row). These results show good performance for the system using the cost-benefit control (middle row). With the cost-benefit analysis, the system answers nearly as many correct as the original, unbounded system (277 versus 283), while posing less than a third of the total queries used without control.

As a baseline comparison, the system was also executed with a fixed policy of using only the conjunctional rewrite for each question (first row, Table 5). This is useful because the conjunctional rewrite is the query reformulation that nearly always leads to the most results from the search-engine back-end. This makes the conjunctional rewrite extremely valuable, as a greater set of intermediate results means a better chance of finding an answer. This experiment shows that the conjunctional-query-only policy does fairly well, leading to 49% accuracy for only 499 total queries. However, this static policy is outperformed by the utility-directed system by a significant margin in terms of accuracy. Using the decision model, a 12% increase is achieved in correct answers at a cost of 680 additional queries.

TABLE 4

Cost and accuracy for a fixed rewrite policy compared with dynamic cost-benefit analysis.

| Max Rewrites Per Question (N) | Total Cost | Correct Answers, Random Order | Correct Answers, Likelihood Order |
|---|---|---|---|
| N = 1 | 499 | 156 | 225 |
| N = 2 | 946 | 217 | 238 |
| N = 3 | 1383 | 243 | 254 |
| N = 4 | 1805 | 252 | 278 |
| N = 5 | 2186 | 272 | 282 |
| N = 6 | 2490 | 268 | 282 |
| N = 7 | 2738 | 272 | 282 |
| N = 8 | 2951 | 279 | 282 |
| N = 9 | 3103 | 276 | 282 |
| N = 10 | 3215 | 281 | 282 |
| N = 12 | 3334 | 281 | 283 |
| N = 15 | 3410 | 282 | 283 |
| N = 20 | 3426 | 283 | 283 |

TABLE 5

Cost (total queries) and accuracy with cost-benefit decisions for four different values for the value of an answer.

| Rewrite Policy | Cost | Correct Answers (out of 499) |
|---|---|---|
| Conjunctional rewrites only | 499 | 247 |
| Cost-benefit k = 10, c = 1 | 1179 | 277 |
| All rewrites | 3426 | 283 |

TABLE 6 shows cost-benefit relationships for four different values of k. With a value of k = 15, the performance of current systems is achieved but with many fewer queries (1346 vs. 3426).

| Value of answer (k) | Cost | Correct answers |
|---|---|---|
| 5 | 603 | 253 |
| 10 | 1179 | 277 |
| 15 | 1346 | 283 |
| 20 | 1405 | 283 |

Figure 10:
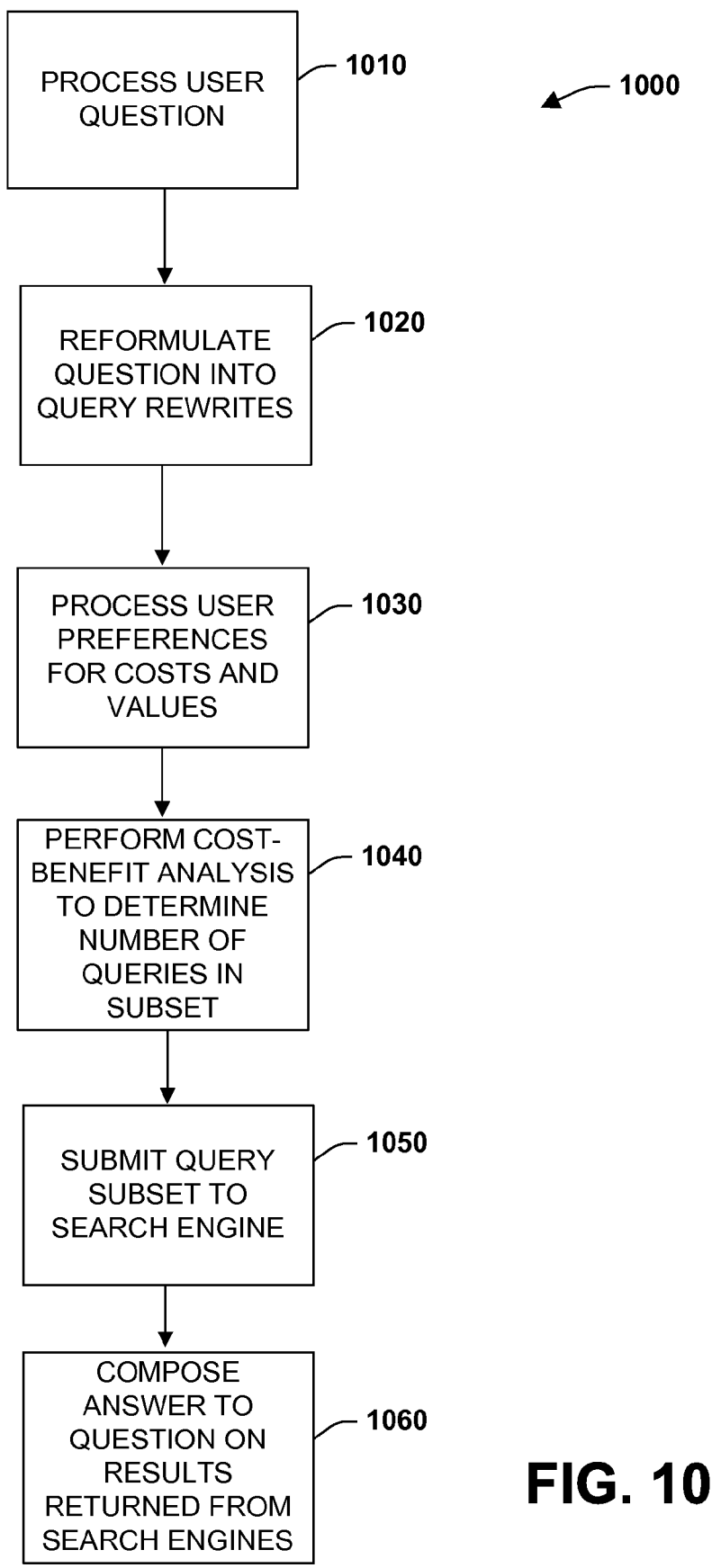
FIG. 10 is a flow diagram illustrating a normalization process in accordance with an aspect of the present invention.

FIG. 10 illustrates a normalization process 1000 in accordance with the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 1010, one or more questions posed by a user are received and processed. At 1020, the received questions are automatically reformulated or rewritten into a set of possible candidate queries. At 1030, user preferences are considered regarding the costs that are acceptable for searching for an answer along with respective value parameters relating to the accuracy of an answer. As noted above, such costs can be expressed in terms of a dollar amount or other parameter. Also, other inputs can be considered such as user goals in performing the search, time of day, language preferences and so forth. At 1040, a cost-benefit analysis is performed to determine an optimized number of queries from the reformulated queries that can be processed as a query subset from the reformulated queries. As noted above, the cost-benefit analysis can be employed to normalize information from a heterogeneous knowledge base. At 1050, the query subset is submitted to one or more search engines and/or databases. At 1060, when results are returned from the search engines, an answer is composed for the user question based upon the normalized request of information posed by the query subset.

Figure 11:
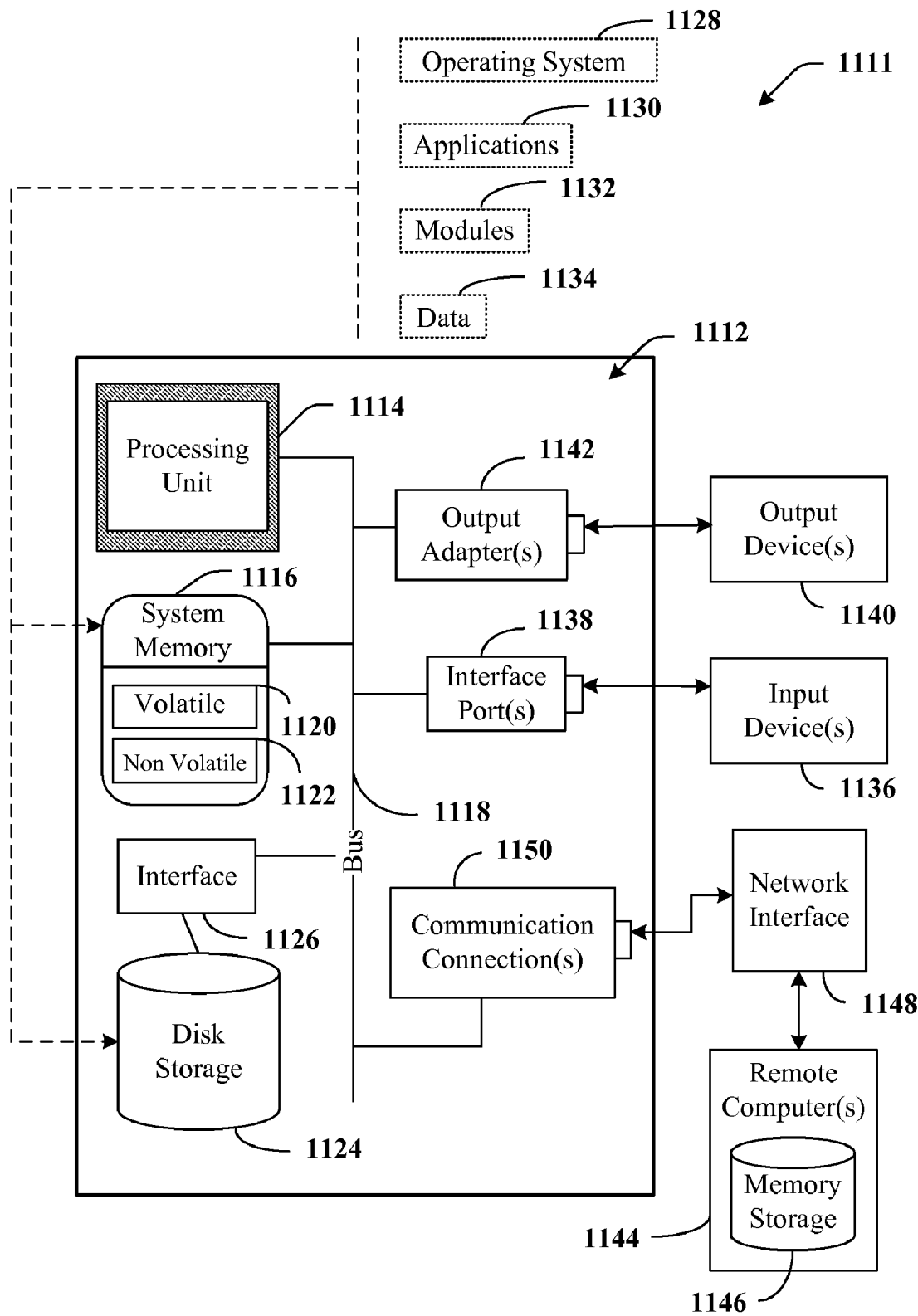
FIG. 11 is a schematic block diagram illustrating a suitable operating environment in accordance with an aspect of the present invention.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
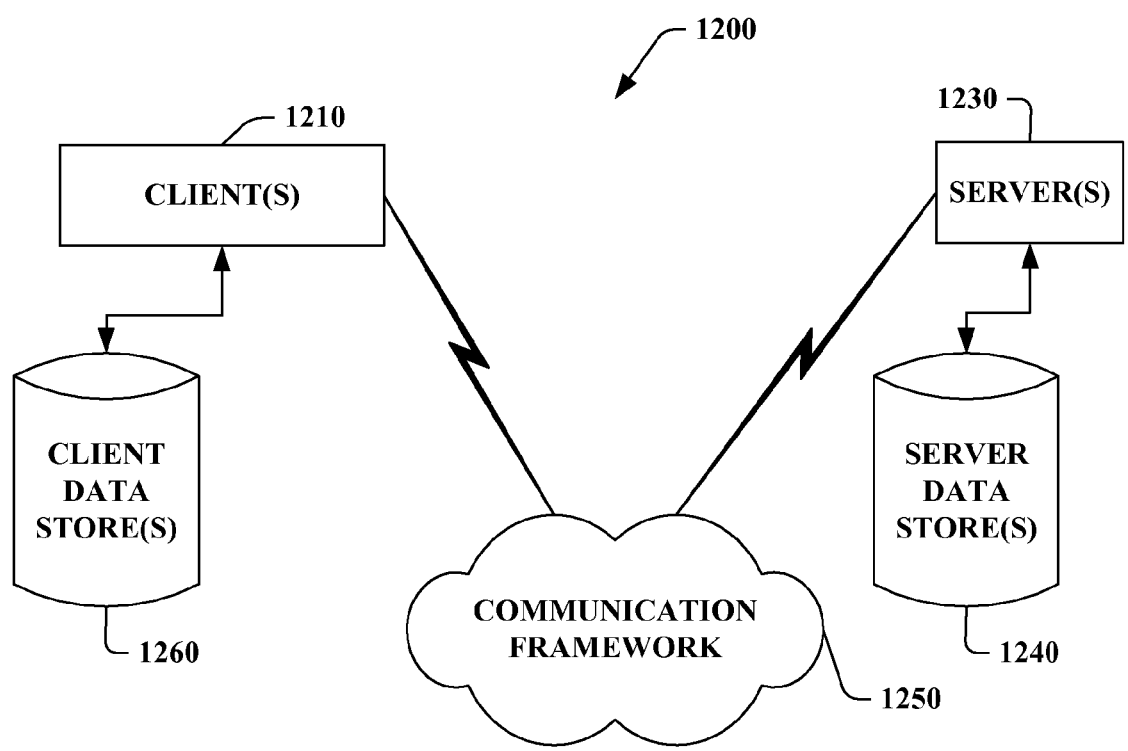
FIG. 12 is a schematic block diagram of a sample-computing environment with which the present invention can interact.

FIG. 12 is a schematic block diagram of a sample-computing environment 1200 with which the present invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the present invention, for example. One possible communication between a client 1210 and a server 1230 may be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A normalization system, comprising:
    an interface component that processes questions posed by users corresponding to a heterogeneous knowledge base;
    a dialog component that requests users to reformulate questions; and
    a normalization component that applies a utility model that predicts accuracy or quality of results to provide a regularized understanding of the knowledge base.

2. The system of claim 1, the utility model dynamically controls extraction of previously unknown or disassociated information from the knowledge base.

3. The system of claim 1, the utility model controls a number of queries submitted to the knowledge base given decision-theoretic considerations.

4. The system of claim 1, the knowledge base includes at least one a local database, a file, a directory, an electronic encyclopedia, a dictionary, a remote database, and a remote web site.

5. The system of claim 1, the utility model applies a cost-benefit analysis to dynamically control the number and types of attempts made to acquire information or answers from the knowledge base in response to a question or questions.

6. The system of claim 5, the utility model includes an analysis of the costs of searching for information versus the benefits or value of obtaining more accurate answers to questions.

7. The system of claim 1, the dialog component initiates a dialog with users based upon predetermined probability thresholds or other criteria that includes a cost-benefit analyses that considers when it would be best to ask a user to reformulate a question rather than expending effort on processing a query that may be expensive in terms of searching for information from the knowledge base or likely to yield inaccurate results.

8. The system of claim 7, the dialog is initiated from an assessment of a cost of delay and effort associated with a query reformulation and a likelihood that a reformulation would lead to an improved result.

9. The system of claim 1, further comprising a preference component that enables users to assess or select various parameters that influence the utility model.

10. The system of claim 9, the preference component processes at least one of a user setting for a cost, a value, and a language preference.

11. The system of claim 10, the preference component includes a model where a user assesses a parameter v, indicating a dollar value of receiving a correct answer to a question, and where a parameter c represents a cost of each query rewrite submitted to a search engine.

12. The system of claim 11, further comprising a value of receiving an answer expressed as a function of details of a current context, the value of the answer is linked to at least one of a type of question, an informational goal, and a time of day for a user.

13. The system of claim 11, further comprising determining a cost of submitting queries as a function of at least one of a current load sensed on a search engine or the numbers of queries being submitted by a user's entire organization to a third-party search service.

14. The system of claim 13, further comprising determining the costs non-linearly with increasing numbers of queries.

15. A method to normalize a database, comprising:
    automatically forming a set of queries from a question posed by a user, each query is assigned a weight; and
    performing a cost-benefit analysis on the set of queries to generate a query subset.

16. The method of claim 15, further comprising automatically ranking the set of queries in an order of likelihood of providing a suitable answer.

17. The method of claim 15, further comprising automatically training at least one model to generate the query subset.

18. The method of claim 15, further comprising submitting the query subset to at least one search engine.

19. The method of claim 18, further comprising receiving results from the at least one search engine and automatically composing an answer.

20. A system to facilitate database normalization, comprising:
    means for formulating a query set from a user question;
    means for assigning a weight to each query; and
    means for forming a query subset from the query set based at least in part on a utility model employed for normalizing the database.

* * * * *